Figure 2:
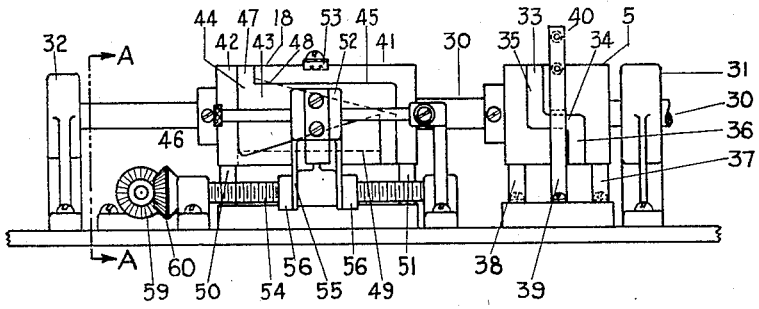

Feb. 21, 1939.　　　　O. E. DUDLEY　　　　2,147,643

SYSTEM FOR GEOLOGICAL EXPLORATIONS

Filed April 9, 1936

SECTION AT "A-A"

INVENTOR.
Oscar E. Dudley
BY
Ezekiel Wolf
ATTORNEY.

Patented Feb. 21, 1939

2,147,643

UNITED STATES PATENT OFFICE 2,147,643

SYSTEM FOR GEOLOGICAL EXPLORATIONS

Oscar E. Dudley, Hyattsville, Md., assignor to Submarine Signal Company, Boston, Mass., a corporation of Maine Application April 9, 1936, Serial No. 73,514

5 Claims. (Cl. 175—182)

The present invention relates to a method and system for observing geological structures, particularly such structures as are commonly present in oil-bearing regions for the purpose in particular of discovering the presence of such formations favorable to the accumulation of oil, gases or the like.

A great deal of development work has been done in the effort to produce surveys that will show beyond question the presence of such formations as are favorable to the accumulation of oils, gases and the like. Such methods for the most part relate to the production of explosive vibrations at one point and their detection at other points with special means to measure the elapsed time and determine the travel of the explosive waves, the points of reflection, their velocities and thereby learn the structure and formation of the various strata forming the earth's surface at the points where the observations were made. Along with this type of observation, observations have been attempted by the use of conductive methods, whereby the conductivity of the earth or the resistivity of the earth between two points is measured. These systems on the whole have proved rather ineffectual principally because the power available or picked up for producing an indication is very small and therefore unable to operate the indicating instruments that are usually used.

In the system employed in the present invention the current is established between two electrodes separated a considerable distance. Between these two points two other electrodes are positioned for the purpose of determining the field potential between these two points.

In the system in accordance with the present invention these potential electrodes may be moved from various points and successive measurements made of the potential established in the field, thus furnishing a measure of the resistivity of the earth between these two points.

In accomplishing these results a commutator system is employed whereby the current applied to the current electrodes and those applied to the potential electrodes are periodically reversed. In each case, however, the connections of the potential electrodes are made in such a manner that the circuit to the indicating instrument from the potential electrodes is open before the break in the current circuit occurs and is closed after the reversal of the current electrodes; in fact, at such a time later that the transient phenomena resulting from the making and breaking of the field has entirely passed before the potential electrodes are connected to the indicating instruments. In this way there is no disturbance at all from the reversal of the potential to the current electrodes and the observations that are made are purely those of the field intensity between the two points at which the potential electrodes are positioned under steady-state conditions. In the present system, therefore, there are employed two so-called current electrodes and two potential electrodes, each associated with a commutator device, and a potentiometer for allowing the proper measurements to be made.

Figure 3:
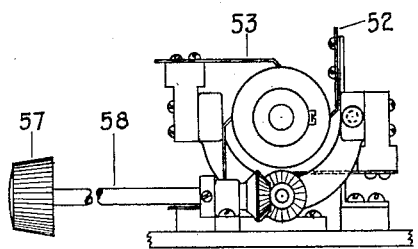
Figure 1:
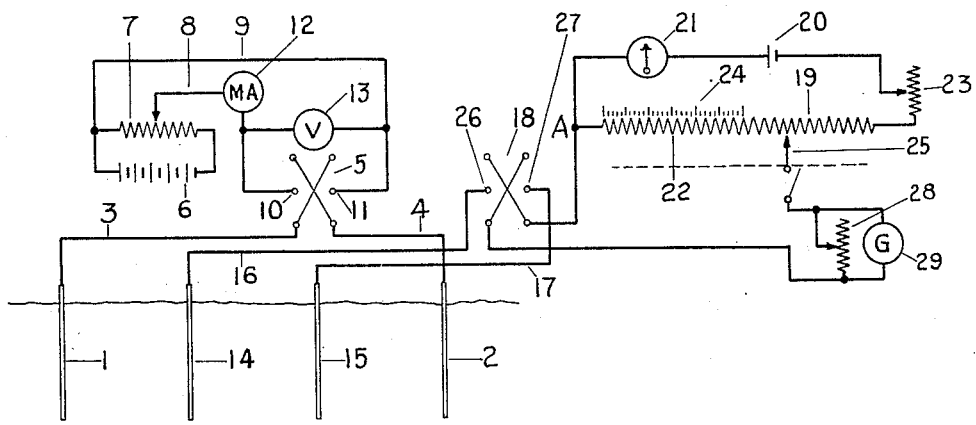

The elements embodied in the commutator and in the rest of the system will be more fully understood by a consideration of the description given below taken in connection with the drawing in which Figure 1 shows diagrammatically the system employed; Figure 2 shows a vertical view of the commutator employed in the system; and Figure 3 shows a sectional view as seen from the line A—A of Figure 2.

In Figure 1 the current electrodes are represented by 1 and 2 which may be made of some conductive material and buried in the earth at any desired distance. These electrodes are connected through the leads 3 and 4 to the commutator device 5 by means of which current from the battery 6 is impressed across them. The battery 6 has connected across it a slide wire 7, and the two leads 8 and 9, 8 from an adjustable position on the slide wire 7 and 9 from the end connection, are impressed across the terminals 10 and 11. A milliammeter 12 and a voltmeter 13 are provided so that the desired amount of current may be impressed in the circuit. The reversal of the commutator 5 reverses the potentials between the current electrodes 1 and 2. Thus, periodically in accordance with the reversal of the commutator 5 the electrical field between the electrodes 1 and 2 is broken and reversed.

The potential electrodes 14 and 15 are connected by means of the leads 16 and 17 to the second commutator 18 which is connected with the potentiometer 19 for determining the resistivity between the places at which the electrodes 14 and 15 are placed in the earth. The potentiometer 19 comprises a battery 20, an ammeter 21 and a resistance 22 with an adjustable resistance 23 by means of which the desired current may be obtained through the resistance 22 in accordance with the calibrated scale 24 to produce a current reading.

The contact 25 may be positioned anywhere along the resistance 22 and is so positioned that the potential impressed from the point A to the contact 25 is equal to the potential supplied across the commutator contacts 26 and 27. Under these conditions no current will be flowing in the series circuit including the portion of the resistance 22, the commutator switch, the galvanometer and the contacts 25. A shunt 28 is provided across the galvanometer 29 to protect the galvanometer while the initial measurements are being made or rather while the initial contact adjustment 25 is made along the resistance 22. In this way the potential and the resistance between the electrodes 14 and 15 may be measured.

The combined commutator 5 and 18 is indicated in Figure 2 and comprises a single shaft 30 supported on two end bearings 31 and 32. On the shaft 30 are mounted two cylinders forming the body of the commutators 5 and 18. The cylinder 5 is of conductive material except the strip 33 which runs around the whole cylinder having two portions 35 and 36 running around the surface of the cylinder in a direction perpendicular to the axis and portions 34 positioned along one of the elements of the cylinder, thus making the peculiar figure shown in the drawing.

Two brushes 37 and 38 are positioned to contact the cylinder 5 always on its conducting surface but separated by the insulating segment 33. Two other brushes 39 and 40 are positioned at the center of the cylinder directly in line with the rotation of the horizontal element 34 of the insulating segment.

It will, therefore, be seen that in one position the brushes 37 and 40 are connected together while in the other position the brushes 38 and 40 are connected together. While the brushes 37 and 40 are connected together, the brushes 38 and 39 are connected together, and when the brushes 38 and 40 are connected together, the brushes 37 and 39 are connected together, thus effecting a reversal of the current impressed upon the electrodes 1 and 2.

The commutator 18, Figure 2, is similarly divided in two parts 41 and 42. These elements 41 and 42 are separated by an insulating segment 43 which comprises a portion 44 normal to the axis of the cylinder and a boundary 45 along one element of the cylinder while the other boundary portion is tapered, as indicated by the line 46, so that the insulating portion on the surface of the cylinder increases from a point at the right of the cylinder over to a point at the left of the cylinder. The small segment 47 is continued around the cylinder and the pattern is again repeated in the same direction as indicated by the dotted lines 48 and 49.

Four brushes are provided upon the commutator 41 similarly as upon the commutator 5. These are brushes 50 and 51 and two other brushes 52 and 53. The brushes 52 and 53 are supported on the threaded bolt 54 by means of the cradle element 55 and the bearings 56. The threaded shaft 54 may be moved by means of the handle 57 by which the shaft 58 may be rotated and thereby the beveled gears 59 and 60 to which the shaft 54 is attached.

By rotating the handle 57 the brushes 52 and 53 may be moved horizontally as viewed in Figure 2 and may, therefore, be adjusted in a position where they will dwell either a longer or a shorter time upon the insulating segments 43. The two cylinders 5 and 18 are relatively adjusted in position for the proper operation of the commutator such that the contacts to the potential electrodes 14 and 15 are opened before the current through the electrodes 1 and 2 is reversed and are closed at such a sufficient time after the reversal that all transient phenomena have passed by. In this way an exceedingly fine measurement may be obtained by means of the galvanometer 29 which is adjusted by means of the sliding contact 25 to produce a null reading.

As explained above, measurements may be made from any desired position, the electrodes 14 and 15 being placed in the ground at such desired points after the position of the current electrodes 1 and 2 is established. The shaft 30 may be rotated by hand but is preferably driven by a small motor at a constant speed which may be adjusted at will.

Having now described my invention, I claim:

1. In a system for determining geological structures by conductive methods, means for effecting the reversal of current supply between two spaced electrodes and means for making periodic observations of the potential between two points in the field of said electrodes including means for adjusting the time interval of observation during the making of observations to periods when steady-state conditions have occurred regardless of the spacing of the electrodes or the ground structure over which the observation is made.

2. In a system of the type described, a commutator device comprising a shaft having a plurality of commutator segments mounted thereon, one set of segments having an insulating element positioned between said segments and comprising two sections normal to the plane of the rotating axis and a section coincident with the rotating axis, the other set of segments having an insulating element including two similar sections normal to the rotating axis and a section joining the first two sections producing a taper on the surface of the commutator with one side parallel to the axis thereof and brush means positioned adjacent said commutator and bearing on it.

3. In a system of the type described, a rotating commutator device comprising a plurality of segments for periodically reversing the flow of current in a pair of wires, a second set of commutator segments having a tapered insulating segment running lengthwise of the axis of the commutator, a pair of brushes positioned to bear upon said insulating segment and means for adjusting the position of the brushes lengthwise of the axis.

4. In a system of the type described, a rotating commutator device comprising a plurality of segments for periodically reversing the flow of current in a pair of wires, a second set of commutator segments having a plurality of insulating elements forming a tapered surface on the commutator and a plurality of brushes, means positioning said brushes to bear on said commutator and means for adjustably moving the brushes lengthwise of said commutator.

5. In a system of the type described, a rotating commutator device comprising a pair of segments for periodically reversing the flow of current in a pair of wires, a second pair of commutator segments having a plurality of insulating elements forming a tapered surface on the commutator and a plurality of brushes, means positioning said brushes to bear on said commutator, means for adjustably moving the brushes lengthwise of said commutator and means for adjustably positioning said pairs of segments with reference to one another.

OSCAR E. DUDLEY.